Figure 1:
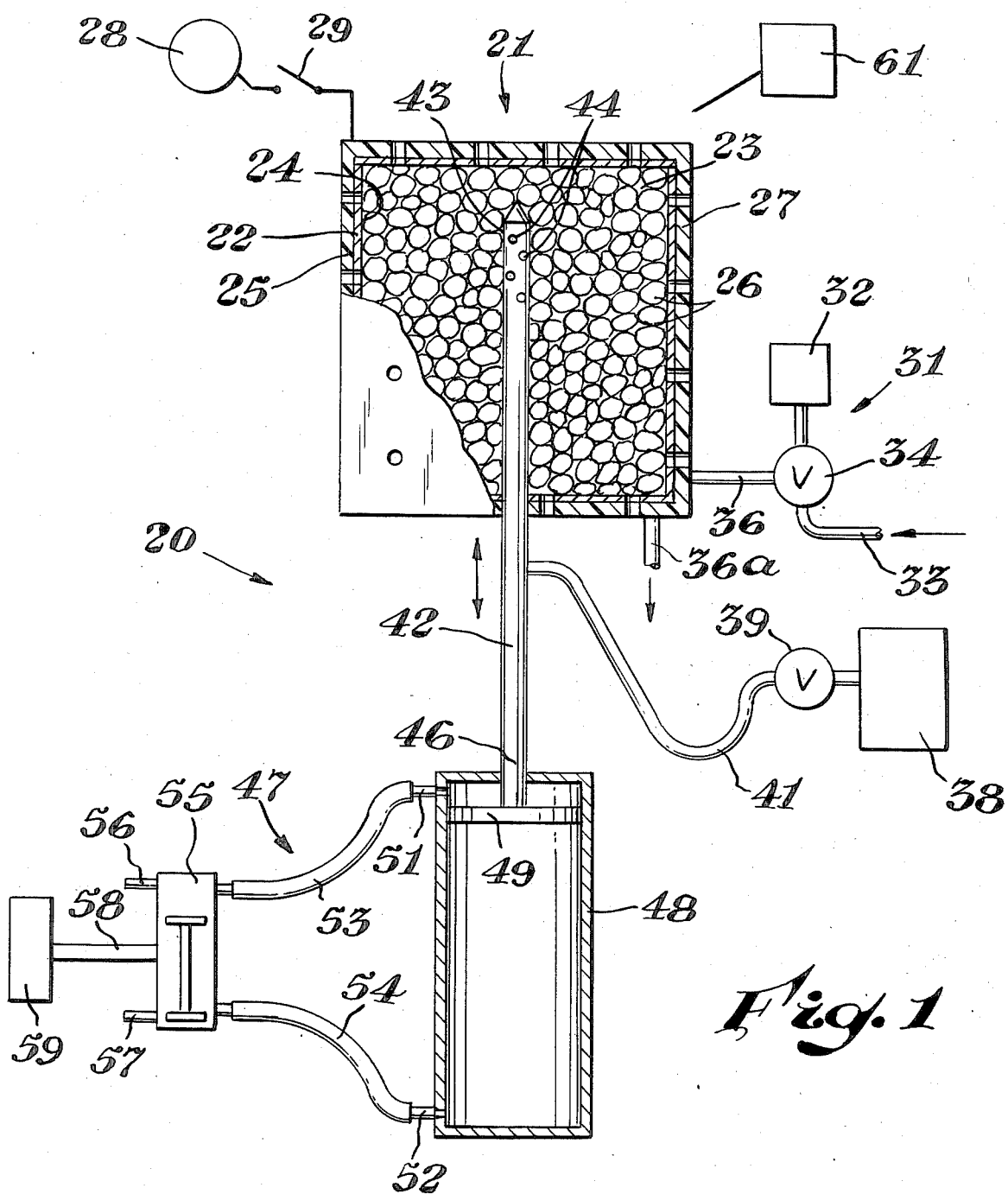

United States Patent [19]

Rubens et al.

[11] Patent Number: 4,693,856

[45] Date of Patent: Sep. 15, 1987

[54] METHOD AND APPARATUS FOR THE PREPARATION OF FOAMED THERMOPLASTIC ARTICLES

[75] Inventors: Louis C. Rubens; Willard E. Alexander, both of Midland; Carl A. Raeck, Essexville, all of Mich.

[73] Assignee: The Dow Chemical Company, Midland, Mich.

[21] Appl. No.: 725,952

[22] Filed: Apr. 22, 1985

[51] Int. Cl.[4] ............................................. C08J 9/22
[52] U.S. Cl. .................................. 264/45.4; 264/45.5; 264/53; 264/DIG. 11; 264/DIG. 18; 425/4 R; 425/817 R
[58] Field of Search .................... 264/51, 53, DIG. 11, 264/45.5, 45.4, DIG. 18; 425/4 R, 917 R

[56] References Cited

U.S. PATENT DOCUMENTS

| | | | |
|---|---|---|---|
| 2,898,632 | 8/1959 | Irwin et al. | 264/DIG. 11 |
| 3,042,967 | 7/1962 | Edberg | 264/DIG. 11 |
| 3,953,558 | 4/1976 | Hatano et al. | 264/54 X |
| 4,073,843 | 2/1978 | Smith | 264/53 |

FOREIGN PATENT DOCUMENTS 907812 9/1969 Canada .
2052358 1/1981 United Kingdom .

Primary Examiner—Philip Anderson

[57] ABSTRACT

Expandible synthetic resinous particles are molded by injecting heated air generally centrally into the mold cavity by means of a probe, withdrawing the probe and heating the surface of the mold. Low densities and rapid cycle times are obtained.

15 Claims, 13 Drawing Figures

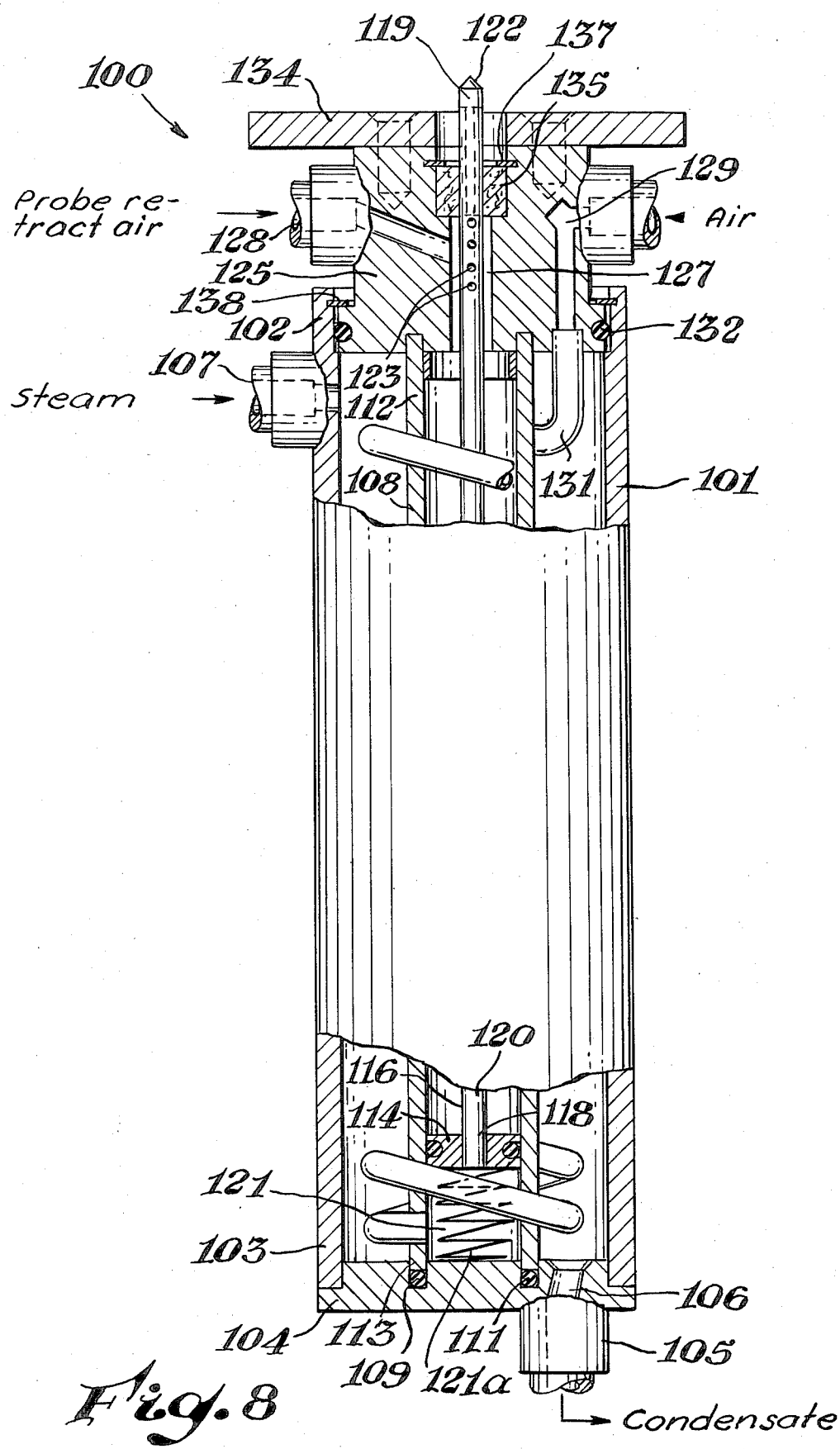

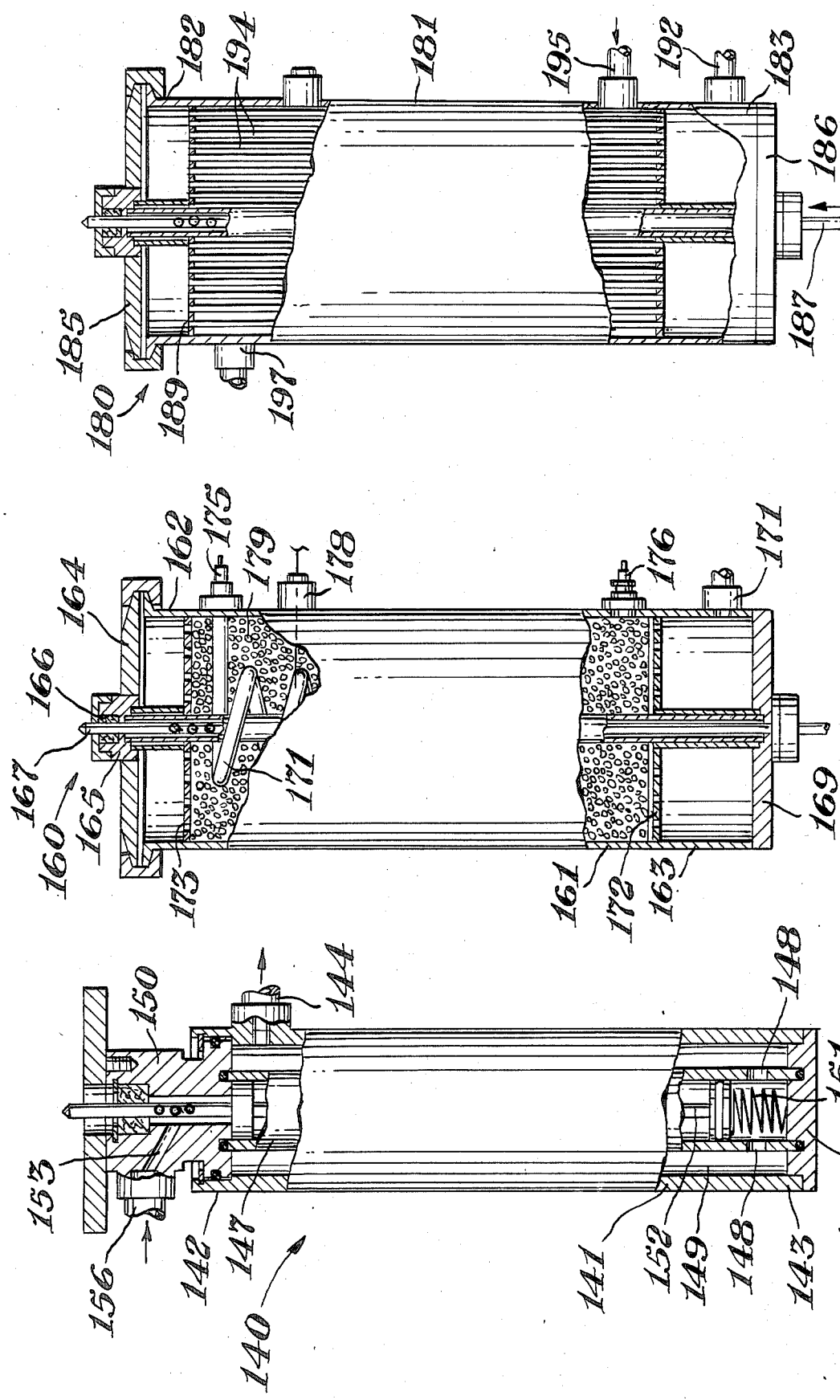

METHOD AND APPARATUS FOR THE PREPARATION OF FOAMED THERMOPLASTIC ARTICLES

A variety of expandable synthetic resinous thermoplastic materials have been available for a substantial period of time. Such expandable particles are used to prepare a wide variety of articles by a process which includes foaming the particles by the application of heat thereto. The foamed particles are subsequently deposited in the mold and heated by applying a heat exchange fluid thereto. A variety of heat exchange fluids have been disclosed, such as those discussed in U.S. Pat. No. 3,953,558, the teachings of which are herewith incorporated by reference thereto. The preferred heat exchange fluid is steam, generally applied under superatmospheric pressure, usually applied at a pressure within the range of about 30 pounds per square inch. The superatmospheric steam is believed to permeate the cell walls of the foamed particles in the mold and when the application of superatmospheric steam to the particles within the mold is discontinued and the pressure on the mold returned to atmospheric pressure, the particles expand and adhere to each other to form a generally continuous cellular unitary body. Such foam molding is well known in the art and is disclosed in the following U.S. Pat. Nos., 2,948,926; 3,417,170; 3,424,827; 3,711,430; 3,941,528; 3,960,784; 4,073,843; 4,083,665; 4,108,934; 4,144,296; 4,191,523; 4,233,006; 4,272,469; 4,276,008; 4,424,286; and 4,440,703. Prefoaming is disclosed in the following U.S. Pat. Nos. 3,023,175; 3,252,228; 3,262,686; 3,273,873; 3,577,360; 3,783,020; 3,855,377; 4,173,608; and 4,274,818; the teachings of which are herewith incorporated by reference thereto. Also of interest is Canadian Patent No. 907,812 and British Patent No. 2,052,358.

For most applications the preferred heat transfer fluid is steam. Steam permits rapid heating and therefore foaming of the particles, but has the distinct disadvantage of requiring molds that can contain the steam pressure sufficient to provide desired interparticulate swelling between the foam particles. Because of the pressure containment requirement of the molds, steam molding is generally thermally inefficient in that a major portion of the steam required to form a molding is used in heating the mold rather than heating the foamed particles. Steam molded foam particles generally contain residual moisture which, in some instances, if the foamed article is employed as dunnage or as a container for a moisture sensitve article, results in damage; because the steam applied to the molded thermoplastic materials permeates the cell walls and is believed to provide a partial pressure of water vapor within the foam cells that contributes to the expansion of the particles within the mold. Steam molded articles having a density less than about one pound per cubic foot have a strong tendency to shrink when cooled to ambient temperature. Such articles which shrink are frequently considered to be comprised of unstable foam. Some articles upon exposure to ambient conditions, that is, one atmosphere of air pressure at a temperature of from about 50 to 100 degrees Fahrenheit, will regain their initial dimensions while others are permanently deformed. foams of the more rigid or brittle polymers exhibit permanent deformation, while those of the softer or more flexible polymers tend to regain their initial configuration.

It would be desirable if there were available a method and apparatus for the preparation of synthetic resinous foams from a particulate starting material which did not directly expose the particles being molded to steam.

It would be desirable if there were available an improved method and apparatus for the molding of particulate expandable synthetic resinous materials to form stable articles having densities less than about one pound per cubic foot.

It would also be desirable if there were available a method and apparatus for the preparation of cellular synthetic resinous articles wherein the mold for such articles had considerably less mass than the mass required by steam molding of such articles.

It would also be desirable to have available a method and apparatus for the molding of particulate synthetic resinous expandable material which did not introduce water into the article.

These benefits and other advantages in accordance with the present invention are achieved in a method for the molding of expanded synthetic resinous thermoplastic articles from a plurality of synthetic resinous particles, the steps of the method comprising providing a plurality of foamed synthetic resinous particles, introducing into the said foamed particles an expanding agent ina quantity sufficient that on heating said particles to a foaming temperature, their volume will increase by a factor of at least 1.7; disposing said particles within a mold having an inner molding surface; introducing a heated gas which is a nonsolvent for the particles at at least one location generally remote from the inner surface of the mold, the heated gas being at a temperature sufficient to cause the particles to expand and adhere to one another; permitting said heated gas to escape from the mold; heating at least a major portion of an internal surface of the mold to a temperature to cause expandable particles adjacent thereto to expand and thereby provide a unitary synthetic resinous foam article.

Also contemplated within the scope of the present invnetion is a foam molding apparatus, the foam molding apparatus comprising in cooperative combination a metal mold having defined therein a molding cavity and means to introduce foamed particulate material into the cavity; the mold having an inner surface and an outer surface, the mold defining gas escape means extending between the inner surface and the outer surface of the mold; means to heat the mold disposed on at least a major portion of the outer surface thereof; means to cool the mold disposed on at least the major portion of the outer surface thereof; means to introduce a heated gas within the mold at a location remote rom the inner surface, said means introducing the gas at a location generally remote from the inner surface of the mold; means to withdraw the means to introduce gas from the cavity of the mold.

The present invention permits the molding of a wide variety of synthetic resinous materials, any foamed synthetic resinous thermoplastic material which can be expanded to at least 1.7 times the volume of the foamed synthetic resinous material on exposure to a temperature above the glass transition temperature of the synthetic resinous material. Generally such foamed materials desirably are lightly crosslinked expandable materials. The degree of crosslinking must not be sufficient to render the materials thermoset, but sufficient to render them swellable in a solvent for the noncrosslinked copolymer. One species of particles suitable for the practice of the present invention is disclosed in U.S. Pat. No. 4,485,193, issued Nov. 27, 1984. Desirable particles for the practice of the present invention may be of any synthetic resinous thermoplastic material which may be foamed and meets the limitation that the foamed material may be expanded on heating to form a foam having a volume at least 1.7 times the volume of the primary or prefoamed material. One desirable and convenient method of obtaining foamed expandable particles for the practice of the present invention is to utilize lightly crosslinked foamed particles, exposing such particles to an atmosphere which will add to the particles additional blowing or expanding agent. For example, foamed particles which are exposed to a gas under pressure wherein the gas is nonsolvent for the synthetic resinous foam for a period of time sufficient to cause at least a portion of the gas to diffuse into the foamed particles, provide a desirable mass of particulate foam which can be subsequently further expanded on heating to a temperature above the glass transition temperature. Suitable gases for most polymers include air, oxygen, nitrogen, helium, argon, dichlorodifluoromethane, butane, isobutane, normal butane, perfluorobutane and the like.

The present invention can be practiced with lightly crosslinked foamed particles prepared specifically for the processes of the present invention. The present invention advantageously can be employed utilizing scrap foam. By way of illustration, foamed sheet which does not meet production specifications can be crosslinked by exposure to ionizing radiation such as an electron beam to provide the desired degree of crosslinking. The sheet desirably in particulate form is then exposed to a gas under pressure such as air, or nitrogen in the case of oxygen sensitive polymers, to provide the expandable particulate material for molding in accordance with the present invention. Suitable foamed synthetic resinous polymers for the practice of the present invention include polymers and copolymers of styrene and ethylenically unsaturated monomers copolymerizable therewith, including alpha-methylstyrene, tertiary butylstyrene, acrylonitrile, butadiene, isoprene, methyl methacrylate, methyl acrylate, and the like; polyethylene, copolymers of ethylene with monomers such as vinyl acetate propylene, butadiene and the like; polyamides such as polycaprolactane and the like.

Figure 2:
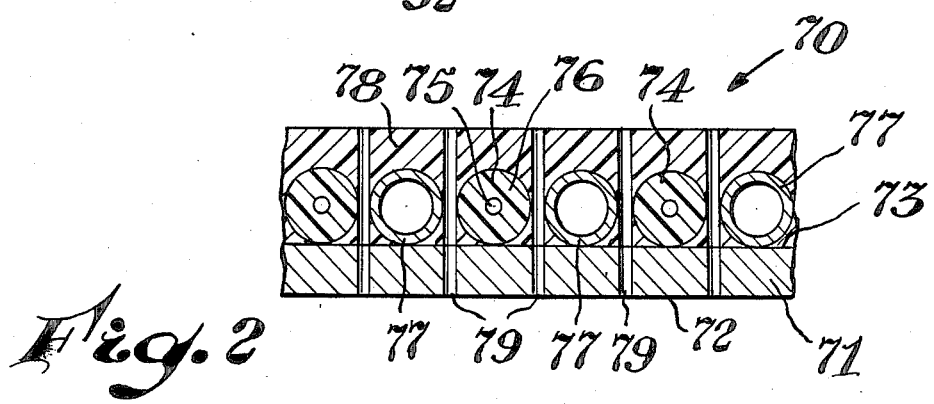
Figure 7:
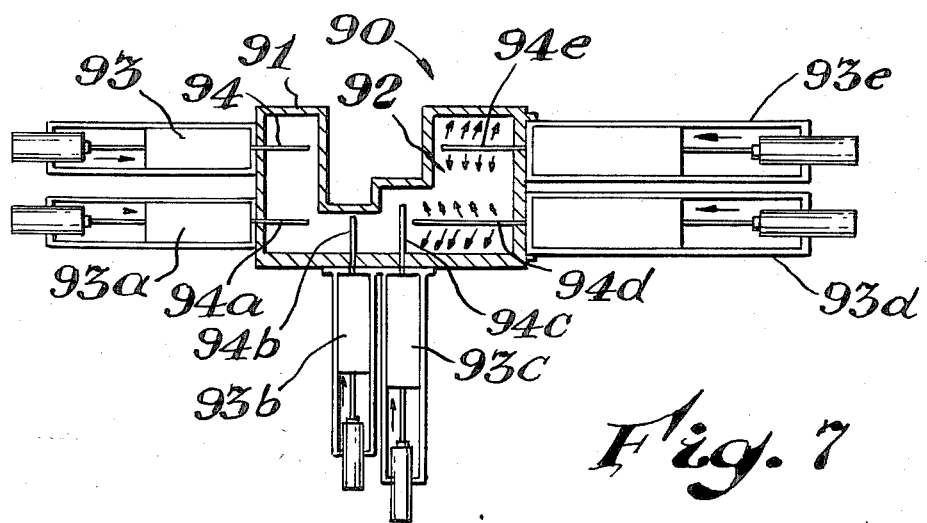
Figure 12:
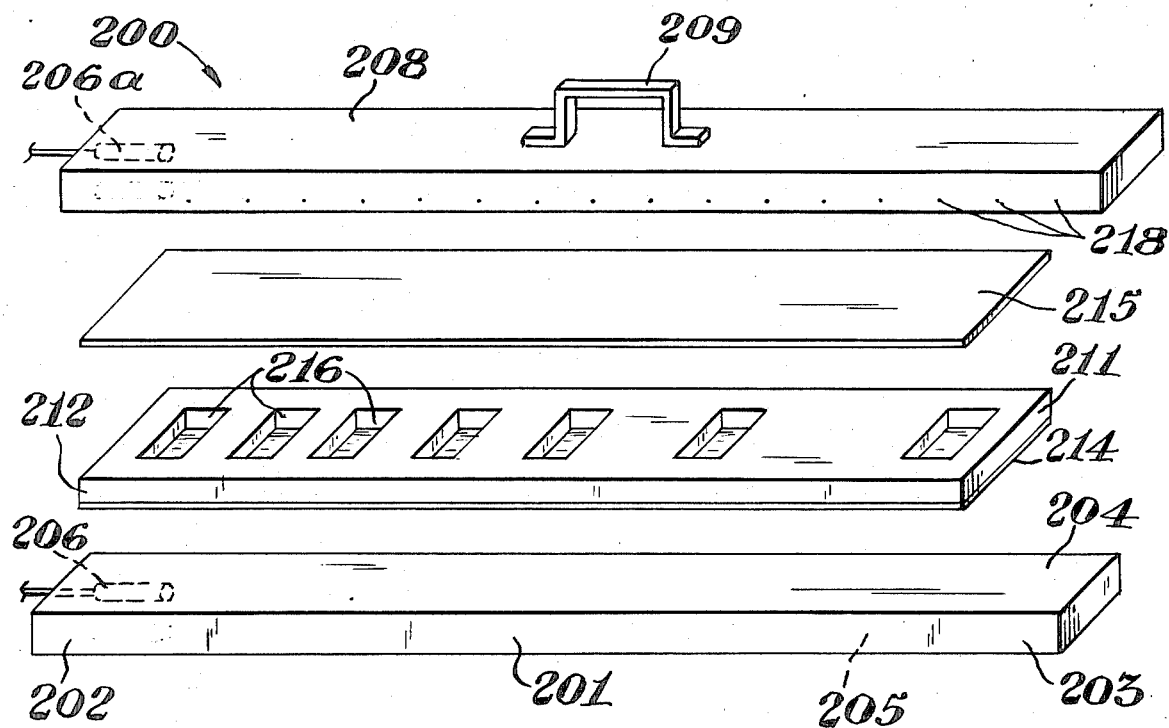
Figure 13:
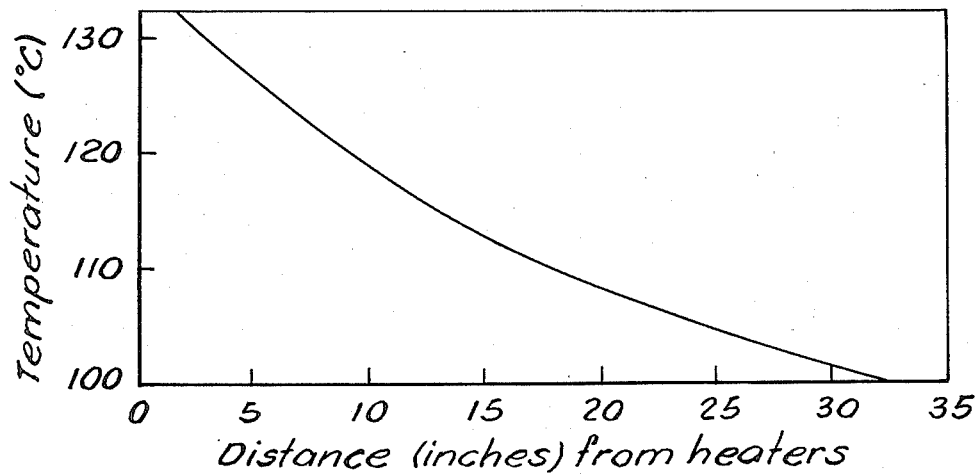

The practice of the present invention will become more apparent from the drawings wherein FIG. 1 is a schematic representation of an apparatus suitable for the practice of the invention;

FIG. 2 is a schematic representation of a mold wall suitable for the practice of the method of the invention;

FIGS. 3, 4, 5 and 6 schematically depict the sequence of internal injection of heated fluid into a foam containing mold;

FIG. 7 schematically depicts the injection of heated fluid into a mold of complex configuration;

FIGS. 8, 9, 10 and 11 schematically depict devices suitable for the heating and injection of gas into a mold;

FIG. 12 is an exploded view of an oven suitable for the evaluation of foamed particles for use in the present invention; and FIG. 13 is a graph of temperature gradient of the oven of FIG. 12.

In FIG. 1 there is schematically depicted a molding apparatus of the present invention generally designated by the reference numeral 20. The apparatus 20 comprises a mold 21. The mold 21 comprises a metallic cavity defining member 22 which defines a cavity 23. The cavity defining member 22 has an inner surface 24 and an external surface 25. A plurality of foam particles 26 are disposed within the cavity 23. The particles 26 are capable of expansion on heating to a temperature above the glass transition temperature to greater than 1.7 times their original volume. Beneficially the cavity defining member 22 is a material of relatively high thermal conductivity such as copper, aluminum and the like. Disposed on the external surface 25 of the cavity defining member 22 is a heat transfer jacket 27. In operative communication with the heat transfer jacket 27 is a heating source 28 and as depicted in FIG. 1, the heat source 28 is a source of electrical energy controlled by a switch 29.

Also associated with heat transfer jacket 27 is a cooling means 31. The cooling means 31 comprises a compressed gas source 32 and a cooling liquid supply means 33, each in communication with a 3-way valve 34. The valve 34 is in communication with the heat transfer jacket 27 by means of conduit 36. The heat transfer means 27 defines a plurality of heat transfer passages therethrough. A heated gas supply means 38 is in operative communication with a valve 39. The valve 39 remote from the heated gas source 38 is in communication with a conduit 41 which in turn is in communication with a means 42 or probe, to supply heated fluid within the cavity 23. The means 42 as depicted in FIG. 1 has a first or gas discharging end 43 disposed generally centrally within the cavity 23. The means to supply heated fluid 42 advantageously is a straight tube having a plurality of perforations 44 disposed within the cavity 23. The means 42 has a second or positioning end 46 which is in selective communication with a positioning means, generally designated by the reference numeral 47. The positioning means 47 comprises a cylinder 48 having disposed therein a piston 49 to which the second end 46 of the probe 42 is affixed. The cylinder 48 has a first conduit 51 and a second conduit 52 disposed generally at opposite ends of the cylinder 48. The conduits 51 and 52 are in communication with conduits 53 and 54 respectively. Conduits 53 and 54 communicate with a selector valve 55. The valve 55 has discharge ports 56 and 57 and inlet port 58 in communication with an actuating fluid source 59. The activating source 59 advantageously for most applications is compressed air. However, if desired, liquid pressure may be employed but compressed gas is preferred. Also in cooperation with the mold 21 is a foam particulate supply means 61.

In operation of the apparatus of the FIG. 1, mold cavity 23 is initially charged with foamed particles from the foam particles supply means 61. If the foamed particles from the supply means 61 are capable of expanding, for example to twice their original volume, the mold will be filled. In the event that the particles from the supply means 61 are foamable to a greater degree, for example 4 or 6 times their original volume, a lesser quantity of particles is supplied to the mold. The probe 42 is positioned within the mold as depicted in FIG. 1. The valve 39 is opened, and heated fluid such as hot air is supplied to the particulate mass within the mold 21 at a location remote from the inner surface 24 of the mold 21 for a length of time sufficient to cause expansion of the particles. The means 42 is then retracted from the mold by means of the positioning assembly 47; that is, the supply means 42 or probe is withdrawn. The switch 29 is closed to provide electrical energy to the jacket 27 and cause the metal member 22 defining the cavity 23 to reach a foaming temperature and cause the adjacent particles to expand and knit together. When the desired degree of expansion and bonding of the particles is attained, switch 29 is opened and the valve 34 is positioned to provide cooling fluid to the jacket 27 which is discharged from a conduit 36a. When the desired degree of cooling has been obtained, valve 34 is repositioned to provide communication between compressed gas source 32 and conduit 36 to eject any cooling liquid from the jacket 27 in the event that a cooling liquid is employed rather than a cooling gas such as air. On completion of the cooling cycle, the mold is opened and the foamed part ejected.

In FIG. 2 there is schematically depicted a cross sectional fractional view of a mold wall in accordance with the present invention, generally designated by the reference numeral 70. The mold wall 70 comprises a metallic cavity defining member 71 having an internal foam particle contacting surface 72 and an external surface 73. Disposed adjacent the surface 73 is a plurality of electrical resistance heating elements generally designated by the reference numeral 74. The elements 74 comprise an electrically conductive member 75 encased in an electrical insulating jacket 76. Disposed between the heating elements 74 and adjacent the surface 73 are thermally conductive conduits 77. The conduits 77 provide a means of supplying cooling fluid to reduce the temperature of the metallic cavity defining member 71 by means of passing a heat transfer fluid therethrough. Advantageously, the process of the present invention exposes the cavity defining member 71 to low pressure relative to the pressures that are employed in conventional steam molding. Therefore the mass of the cavity defining member can be small relative to steam molding cavities and the temperature of the cavity defining member 71 can be rapidly cycled. The heating elements 74 and the cooling elements 77 as depicted in FIG. 2 are encapsulated within a synthetic resinous matrix 78 which serves to maintain the members 74 and 77 in close proximity with cavity defining member 71. A plurality of passages 79 are defined between member 71 and matrix 78 which permits the escape of gas from the cavity defined by member 71. Such mold construction permits rapid change of temperature in the cavity defining member 71 which advantageously is a thermally conductive metal such as aluminum or copper.

Figure 3:
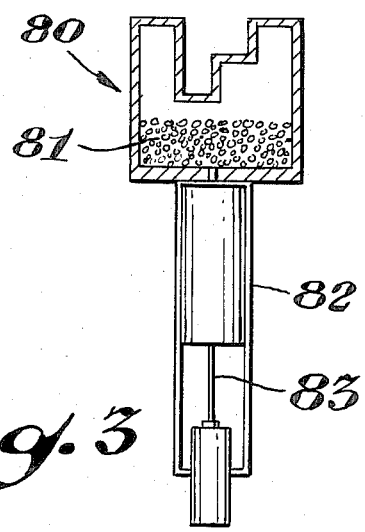

FIG. 3 schematically depicts a sectional view of a mold generally designated by the reference numeral 80 having disposed therein a foamed expandable mass of particles 81, the particles 81 being capable of expansion on heating to at least about 4 times their initial volume. At the bottom of the mold 80 is disposed a heated gas injection assembly generally designated by the reference numeral 82 having a hot gas injection probe 83 disposed in a fully retracted position from the cavity of the mold 80.

Figure 4:
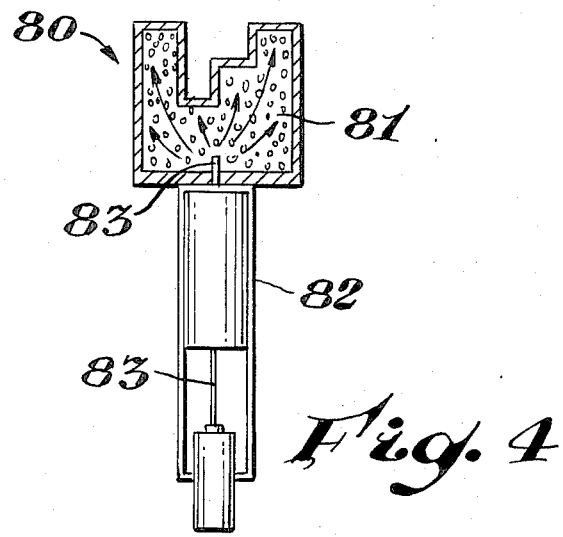

FIG. 4 depicts the mold 80 wherein the probe 83 has been partially inserted into the cavity of the mold 80, and heated gas such as air is injected into the cavity of the mold 80 to cause fluidization of the particulate mass 81 and partial expansion thereof.

Figure 5:
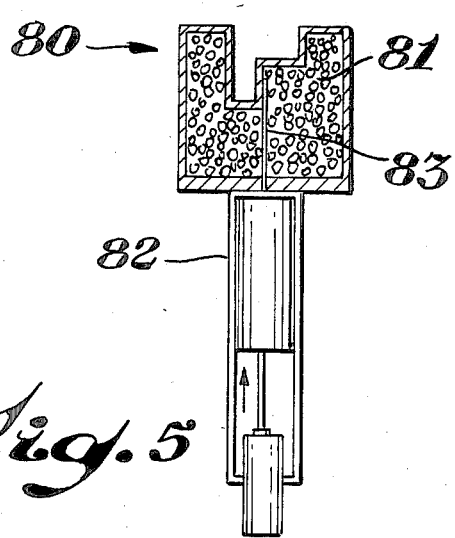

In FIG. 5, the particulate mass 81 has expanded to fill the mold and the probe 83 has been fully inserted into the cavity of the mold 80.

Figure 6:
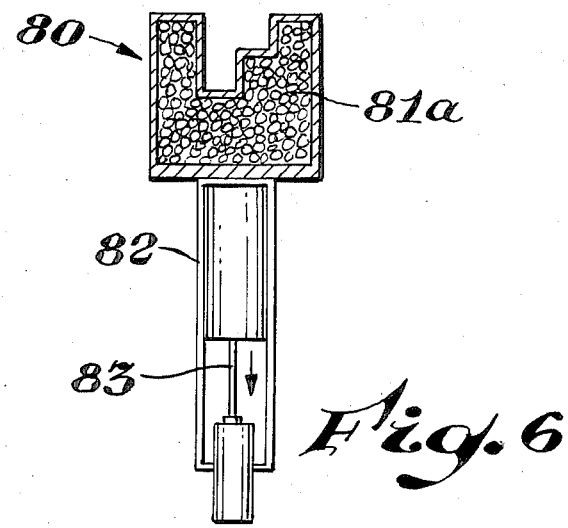

FIG. 6 depicts the sequential step wherein the probe 83 has been withdrawn from the cavity of mold 80 and the particulate mass has expanded and knit together to form an article generally designated by the reference numeral 81a.

In FIG. 7 there is schematically depicted a sectional view of a molding assembly generally designated by the reference numeral 90. The molding assembly 90 is particularly suited and adapted for the preparation of larger molded foam articles employing a plurality of heated gas injection sites. Molding assembly 90 comprises a mold 91 having a cavity 92. A plurality of heated fluid injection assemblies are designated by the reference numerals 93, 93a, 93b, 93c, 93d and 93e. Each of the gas heated fluid injecting assemblies 93 through 93e has associated therewith a fluid injecting probe 94 through 94e extending into the cavity of the mold 91. An assembly such as that depicted in FIG. 7 is desirable for molding large and complex articles. The use of multiple heated fluid injection sites provides greater uniformity of foaming or expansion than would be obtained by a single probe and minimizes the localized foaming and fusion of the particles which can prevent the heating fluid from reaching more distant regions in the mold.

In FIG. 8 there is schematically depicted a sectional view of a heated fluid injecting assembly suitable for the practice of the present invention generally designated by the reference numeral 100. The assembly 100 comprises in cooperation a generally cylindrical housing designated by the reference numeral 101. The cylindrical housing has a first or upper end 102 and a second or lower end 103. The second end 103 is closed by means of a circular plate-like member 104 having affixed thereto a conduit connection 105 providing communication with space interior to the housing 101 by means of passage 106. The housing 101 has disposed at its first end 102 a conduit connection 107. Disposed within the housing 101 and spaced therefrom is a pneumatic cylinder 108. The cylinder 108 as depicted in FIG. 8 is coaxial with the housing 101 and is in sealing engagement with the plate-like member 104 by means of an O-ring 109 disposed within an annular groove 111 within the plate 104. The pneumatic cylinder 108 has a first end 112 adjacent first end 102 of the housing 101 and a second end 113 adjacent the second end 103 of the housing 101. Disposed within the pneumatic cylinder 108 is a piston 114. The piston 114 has affixed thereto a heated fluid injecting means or probe 116. The probe 116 has a first or lower end 118 and a second or upper end 119. The probe 116 as depicted in FIG. 8 is of generally hollow cylindrical configuration having disposed therein a longitudinal axial passageway 120. The passageway 120 is in communication with space 121 defined by the pneumatic cylinder 108, plate-like element 104 and piston 114. Within the space 121 is disposed a buffer spring 121a. At the second end 119, the probe 116 is closed by means of an end cap 122. Adjacent the second end 119 of the probe 116 is disposed a plurality of openings 123 which provide communication between the passageway 120 and space external to the probe 116. A distribution assembly 125 is disposed adjacent the first end 102 of the housing 101 and first end 112 of the pneumatic cylinder 108. The distribution assembly 125 is in sealing engagement with both of these ends. The distribution assembly 125 defines a generally axially disposed passage way 127 through which the probe 116 passes. The assembly 125 defines a first passageway 128 which communicates with passageway 127 and space external to the assembly 125. The assembly 125 defines a second passageway 129 which communicates with a heat transfer tube 131. The heat transfer tube 131 has a generally helical configuration and is disposed external to the pneumatic cylinder 108 and internal to the housing 101. The heat transfer tube 131 extends from a first end 102 of housing 101 to a location adjacent the second end 113 of the pneumatic cylinder 118 and is in communication with space 121 between the piston 118 and the plate-like member 104. The distribution assembly 125 is in sealing engagement with the housing 101 by means of an O-ring 132, and is in sealing engagement with first end 112 of the pneumatic cylinder 108. The distribution assembly 125 has affixed thereto remote from first end 102 of the housing 101 a mounting flange 134. Remote from the first end 102 of the housing 101, the distribution assembly has disposed therein a seal 135 which engages the distribution assembly 125 and the probe 116. The seal 135 and the distribution assembly 125 are maintained in position by means of internal retaining or snap rings 137 and 138.

In operation of a heated gas injection assembly as depicted in FIG. 8, the flange 134 is affixed at a suitable location on a mold. Conduit connection 107 is provided with a suitable conduit for the discharge of condensate and steam from space between the housing 101 and the pneumatic cylinder 108. Passageway 128 is provided with a source of compressed gas such as compressed air as is passageway 129. Passageway 129 is provided with a source of heating fluid such as air. Advantageously the generally helical tube 131 has high thermal conductivity and beneficially is of copper. When steam is provided to passageway 107, tube 131 is heated and the gas disposed therein or passing therethrough is also heated.

As depicted in FIG. 8, when the pressure within the tube 131 and the space 121 is at atmospheric or low pressure, generally no gas flows within the tube 131. When the pressure is raised, the piston 114 is forced toward first end 112 of the cylinder 108 forcing the probe 116 into the mold and heated air is expelled from the openings 123 of the probe 116. When sufficient heating fluid has been introduced into the mold, the flow of air to passageway 129 is stopped and the pressure to passageway 128 is increased thereby retracting the probe from the mold.

In FIG. 9 there is schematically depicted a sectional view of an alternate probe positioner suitable for the practice of the present invention, generally designated by the reference numeral 140. The positioner 140 comprises an external housing 141 of generally cylindrical configuration having a first end 142 and a second end 143. A conduit connection 144 is disposed generally adjacent first end 142 and provides communication with space internal to the housing 141. The second end 143 is closed by means of a generally cylindrical disk 146. Disposed within the housing and spaced therefrom is a pneumatic cylinder 147. The cylinder 147 is of generally similar construction to the cylinder 108 of FIG. 8. Adjacent the second end 143 of the housing 141, the cylinder 147 defines a plurality of passageways 148 which communicate with an annular space 149 defined between the cylinder 147 and the housing 141. A helical buffer spring 151 is disposed within the pneumatic cylinder 147 between a probe-piston assembly 152 and the closure disk 146. At the first end 142 of the housing 141 is a support assembly 152 of generally similar construction to the assembly 125 of the FIG. 8. A single conduit connection 156 is defined by the assembly 150. The conduit connection 156 communicates with space internal to the pneumatic cylinder 147 by means of passageway 153.

In operation of the probe positioner assembly 140, hot air is fed to the annular space 149 from the conduit connection 144 under sufficient pressure to cause the probe positioner assembly 152 to move toward the first end 142 and force the probe of the probe assembly 152 into a mold to which the assembly 140 is attached. When sufficient heating fluid has been supplied to the mold, fluid supply is discontinued and gas under pressure is applied to passageway 152 causing the probe to be retracted.

In FIG. 10 there is schematically depicted a sectional view of a fluid heating assembly and probe generally designated by the reference numeral 160. The assembly 160 comprises a generally cylindrical hollow housing 161 having a first end 162 and a second end 163. The first end 162 is closed by a first removable end cap 164. End cap 164 has generally centrally disposed therein a probe support means 165 having a sealing means 166 in engagement with a hollow probe 167, having a plurality of gas passages 168 disposed along the length thereof to provide communication between space within the probe and space external thereto. When the probe is in the retracted position, no gas flows. When the probe is in an extended position, the portion of openings within housing 161 are inlet passages, and passages 168 external to the housing 161 are discharge passages. The second end 163 of the housing 161 is closed by an end cap 169 of generally similar configuration to the end cap 164 but permanently affixed to the housing 161. The housing 161 adjacent the second end 163 has a conduit connection 171 in operative communication with space internal to the housing 161. The probe 167 extends through a cap 169 and is connected to a probe positioner not shown. A perforate plate 172 is positioned within the housing 161 adjacent the second end 163. The plate 172 is generally normal to the axis of housing 161 and the axis of the probe 167. A second perforate plate 173 is positioned adjacent the first end 162 of the housing 161 and is generally parallel to the plate 170.

A generally helically disposed electrical resistance heater 171 is disposed generally coaxial with the probe 167 and has electrical terminals 175 and 176 external to the housing 161. A thermocouple fitting 178 is disposed on the housing between the terminals 175 and 176. Space between the perforate plates 172 and 173 not occupied by the probe and the resistance heater and the thermocouple is filled with a coarse particulate metal 179. Beneficially, this coarse particulate metal is copper shot, having a diameter of about 0.1 inch such as number 4 or 5 shot. The probe and fluid heat assembly depicted in FIG. 10 is particularly suited for the preparation of small moldings in the laboratory.

In operation, power is applied to the terminals 175 and 176 until particulate metal 179 reaches the desired temperature. The probe is forced into the mold in the direction of the black arrow and air is supplied through the conduit connection 171. The air passing through the metal 179 is heated to the desired molding temperature and maintained at that temperature for an appropriate period of time. The air supply is then discontinued and the probe retracted from the mold. For laboratory purposes, the assembly 160 provides a simple arrangement which requires air line, one electrical supply and one thermocouple. The probe positioning may be done manually, mechanically or pneumatically.

In FIG. 11 there is depicted a fluid heating assembly with probe generally designated by the reference numeral 180. The housing 181 has a first end cap 185 and a second end cap 186, the end caps being of similar construction as that depicted in FIG. 9. The end caps 185 and 186 support a probe 187 which is axially positionable. Disposed within the housing 181 and positioned generally normal to the axis of the housing 181 is a first tube sheet 189. The tube sheet 189 is disposed adjacent the first end of the end 182 of the housing 181. A second tube sheet 191 is generally parallel to the first tube sheet 189 and is disposed adjacent but spaced adjacent end cap 186 and spaced therefrom. A conduit connection 192 is in communication with space between the tube sheet 191 and the end cap 186. A plurality of tubes 194 extends between tube sheets 189 and 191. Disposed adjacent the second end 183 of the conduit 181 is a conduit connection 195 which communicates with space adjacent tube sheet 191 and the end cap 186. A second conduit connection 197 provides communication with space adjacent tube sheet 189 and remote from end cap 185.

In operation of the heating probe assembly of FIG. 10, a heating fluid such as steam is supplied to conduit connection 195 and exhausted from conduit connection 197 after passing over the heat exchange tubes 194. A foamed polymer heating fluid is supplied to conduit connection 192, passes through the tubes 194 and is discharged when the probe 187 is moved in the direction indicated by the arrow. The assembly of FIG. 11 is desirable for molding larger articles.

In FIG. 12 there is depicted a schematic isometric partially cutaway view of an oven assembly employed to evaluate the expansion characteristics of foamed or foamable synthetic resinous thermoplastic particles. The oven assembly is generally designated by the reference numeral 200. The oven assembly 200 comprises a first metal bar 201 having a first end 202 and a second end 203. The bar 201 is of elongate rectangular configuration and has a first major surface 204 and a second major surface 205. An electrical cartridge heater 206 is disposed in the first end 202 of the bar or member 201. As depicted in FIG. 12, the member 201 can be considered the bottom. A second bar member 208 is disposed above member 201, and is of like configuration to the bar member 201 and has a cartridge heater 206a disposed in an end which is adjacent end 202 of bar member 201. Member 208 differs from member 201 only in the provision of a handle member 209 remotely disposed from member 201. A generally planer rectangular member 211 is disposed between the members 208 and 201. Member 211 has a width about equal to the width of the members 201 and 208. Member 211 is a laminate of structure having a major layer 212. The layer 212 beneficially is of synthetic resinous foam, a foam which is not affected by the temperatures at which the synthetic resinous thermoplastic particles are to be investigated. Affixed to the layer 212 is a second layer 214. The layer 214 beneficially is an aluminum foil. Generally parallel to and remote from the layer 214 is a layer 215 of conductive metal foil such as aluminum which is not adhered to the layer 211. The layer 211 defines a plurality of spaced apart openings generally designated by the reference numeral 216.

In operation of the oven assembly 200, a plurality of small holes is drilled transversely in the edge of one of the members such as member 208. Such holes are indicated by the reference numeral 218 and appear in the drawing as black dots. The member, such as the member 211, without the openings 216 is placed on the surface 204, the foil layer 215 applied to the layer 212 and member 208 disposed on the foil layer 215. The member 201 is supported at either end by a pedestal about 6 inches above a working surface such as a bench top. Power is then applied to the cartridge heaters 206 and 206a for a sufficient length of time that the temperatures of members 201 and 208 are generally constant. Thermocouple readings are taken along the length of the bar utilizing the openings 218 as thermocouple wells. The results are then plotted as depicted in FIG. 13. Openings are then formed in the member 211 at the appropriate spacing to obtain the desired temperatures wherein synthetic resinous foam is employed. It is generally desirable to form the openings in a second piece of thermoplastic foam prior to the lamination of the foil or layer 214.

The plot in FIG. 13 was derived from an oven employing 36 inches long aluminum bars which were 2½ inches wide and 1½ inches thick. The layer 211 was 0.625 inch thick polyisocyanurate foam. The openings corresponding to openings 216 measured 2 inches in width and 1.375 inches in length. The aluminum foil used was about 0.001 inch in thickness.

EXAMPLE 1

A mold was fabricated having a cavity which was about a 3-inch cube. The walls and bottom of the mold were formed of ⅜-inch thick plywood lined with a one-half inch thick honeycomb for heat insulation, the honeycomb being commercially available under the trade designation of NOMEX. On the inner surface of the honeycomb lining was formed a plurality of grooves measuring approximately ⅛ inch in width and about ⅛ in depth. The grooves were arranged in such a manner as to convey air or other cooling gas from the bottom of the mold to the upper edges. A metal foil resistance heater encapsulated within thin insulating layers was adhered to the inner surface of the honeycomb thermal insulation. The electrical resistance heaters were then laminated to 10 mil aluminum sheet to provide in essence an open top box having an aluminum surfaced mold cavity therein. The top or sixth side of the mold was fabricated in a similar manner with the exception that no heater was employed. A heater such as is depicted in FIG. 10 was positioned centrally on the bottom of the box. The probe of the heater was connected to a pneumatic cylinder which would selectively position the probe within the mold and remove the probe from the mold. The heater was a 4-inch diameter stainless steel tube filled with 25 pounds of copper shot having a diameter of about 0.1+ inch. Thermocouples are positioned to measure the surface temperature of the heated aluminum foil and to measure the temperature in about the center of the molding cavity. The unheated mold top was loosely fitted and was maintained in position by a first indicator from which the molding pressure was determined.

Moldings were prepared from suspension polymerized styrene divinylbenzene mixture which contained 99.92 weight percent styrene and 0.04 weight percent each of divinylbenzene and ethylvinylbenzene. After polymerization the resultant beads were impregnated with 18 weight percent of a 60/40 by weight mixture of dichlorodifluoromethane and trichlorofluoromethane. The particles after 4.5 minutes in a 120° C. oven expanded to 68 times their original volume. The foamed particles were stored overnight at ambient conditions and subsequently were exposed to 50 pounds per square inch gauge of air for a period of 19 hours at 25° C. A sample of the foamed particle was exposed to 120° C. for one minute. The secondary treatment caused an expansion of 1.82 times the original volume of the foamed particle. Four 3-inch cubes were molded from the air pressurized particles. Immediately after removal from the pressurized vessel. In each molding the mold cavity was loosely filled with foam particles and the interior and mold surface heating conditions were varied. The copper shot was maintained at a temperature of 132° C. and the air pressure on the shot with the probe retracted was maintained at 40 pounds per square inch gauge.

In molding I the probe was inserted into the mold until the center of the foam had reached 110° C. and the probe fully retracted. Heating to 110° C. required about 15 seconds. On withdrawal of the probe, the mold surface heaters were activated until the surface temperature of the mold reached 110° C. Heating of the mold required about 35 seconds.

When power to the resistance heater was turned off, air was forced through the cooling channels formed in the honeycomb under the surface heaters. The pressure on the mold surface reached a maximum value of about 3.5 pounds per square inch after 50 seconds and then decreased. The resulting molding was void free in the center, showed excellent interior particle swelling, and had 5 smooth surfaces. The surface adjacent the unheated cube was 0.5 pounds per cubic foot.

A second molding was prepared wherein the surface heaters were activated first and the hot air probe inserted after 40 seconds. The mold surface reached a temperature of 120° C. The foam pressure against the wall increased slowly and reached about 1.2 pounds per squre inch maximum. The probe remained in the foam for a period of 20 seconds. After a total molding period of 60 seconds, the probe was withdrawn and the mold cooled by passing air through the channels in the honeycomb. The resultant molding was of poor quality and exhibited channeling in the center of the mold. The surface appearance was poor. Apparently, insufficient pressure developed to give the desired transformation to the foamed particles.

A third molding was prepared repeating the procedure used to prepare the first molding with the exception that the surface heaters were not activated. The mold pressure showed a maximum pressure of about 2 pounds per square inch. The resulting molding had a rough surface and some internal voids.

A fourth molding was prepared wherein only the mold walls were heated to a temperature of about 120° C. The hot air probe was not employed. The interior temperature of the molding reached about 80° C. and the pressure at the mold surface reached about 2 pounds per square inch. The resultant molding had 5 smooth faces, that is, the faces that were against the heated mold walls. The center of the molding showed poor to no fusion in that region.

Example II

A sheet of crosslinked low density polyethylene foam commercially available under the trade designation of Plastizote P-1046 was obtained from BXL Corporation. The polyethylene foam sheet was dark blue, 1.3 inches thick and had a density of 2.54 pounds per cubic foot. The foam was of crosslinked low density polyethylene. The average cell size was between about 0.2 and 0.3 millimeters. The sheet was cut with a knife into cubes measuring 0.375 inch on the edges. The cubes were subsequently exposed to air, were stored in an atmosphere of air under a pressure of 50 pounds per square inch gauge for 144 hours. Within less than 5 minutes after the air pressure had been reduced to atmosphere, cubes were heated in contact with hot air at temperatures of from 100°–130° C. in 5° C. increments to determine time and temperature for optimum expansion which appeared to be about 125° C. for a period of about 45–60 seconds.

The hereinbefore described mold was loosely filled with 8.6 grams of air pressurized cubes. The cooper shot heat sink was maintained at 142° C. and the pressure with no flow was 40 pounds per square inch gauge. The hot air probe was inserted into the center of the mold, and the mold wall heater activated 15 seconds after insertion of the probe. The probe was fully retracted after 45 seconds and the power to the resistance wall heaters was turned off and cooling air blasted through the channels of the honeycomb. The mold walls reached a maximum temperature of about 115° C. The center of the molding reached a temperature of about 110° C. The maximum pressure of the mold wall was about 5.3 pounds per square inch gauge. The molding was removed from the mold 175 seconds after mold insertion when the mold wall temperature had dropped to about 55° C. The resultant molding had a density of 1.17 pounds per cubic foot. The cube showed faithful reproduction of the interior of the mold and showed good square corners. A $\frac{1}{8}$-inch thick slice and 1.25 inches cut from the center of the mold showed good fusion and could be stretched to double its original dimension without tearing.

Cubes as used in the previous example were maintained under an air pressure of 30 pounds per square inch gauge at 25° C. for 144 hours and were tested for expansion by exposure to air at various temperatures and periods of time. At a period of from about 30–70 seconds at 120°–130° C., the expansion was about 1.8 to 1.9 times the original foam volume. The mold previously described was charged with 10.9 grams of the air-pressurized cubes. The cooper shot was maintained at a temperature of 142° C. under conditions of no air flow.

EXAMPLE III

The procedure of Example II was repeated with the exception that the probe was retracted after 60 seconds and the mold wall heated to about 133° C. The pressure on the mold wall was less than 1 pound per square inch during the molding cycle. The cubicle particles deformed into the polygonal shapes required to provide interfacial contacts between neighboring particles. Some surface voids were in the molding. The resulting molding was a tough coherent structure suitable for cushion packaging and had a density of 1.44 pounds per cubic foot.

EXAMPLE IV

Polyethylene foam cubes as initially employed in Example II were confined in an atmosphere of 50 pounds per square inch gauge air for a period of 240 hours at 25° C. Secondary foaming of the cubes at a temperature of 110° C. provided an expansion ratio of 2.34 times the volume of the untreated foam particles. The hereinbefore described mold was filled with 4.9 grams of the air pressurized foam polyethylene cubes. The molding conditionings employed were those of Example II. The resultant molded cube was dimensionally stable after being molded, had sharp well filled corners, and no visible interparticle voids. The resultant foam had a density of 0.6 pounds per cubic foot.

EXAMPLE V

A low density polyethylene foam having a density of 0.915 grams per cubic centimeter, a melt index of 5.5, an average molecular weight 202,000, and a number average molecular weight of 15,300 was masticated in a twin screw extruder together with 5 weight percent based on the weight of the polymer of azobisformamide, commercially available under the trade designation of Celogen AZ manufactured by Uniroyal Corporation. The temperature of the polymer in the extruder was about 140° C. The polymer was discharged from the extruder in the form of 0.76 centimeter diameter strands. The strands were cut into 0.86 centimeter lengths and irradiated with 2 million electron volt electrons to a dose of 3.5 megarads, thereby slightly crosslinking the polymer. The lightly crosslinked particles were subsequently immersed in a salt bath of 53 weight percent potassium nitrate, 40 weight percent sodium nitrite and 7 parts by weight of sodium nitrate for a period of 2 minutes. The resultant particles were roughly cylindrical foam pieces averaging about 1.75 centimeters in diameter and about 1.95 centimeters in width. The particles were cooled to room temperature and stored overnight. The particles had a density of 5.3 pounds per cubic foot and are hereinafter referred to as prefoamed particles. The foamed particles were maintained under an atmosphere of nitrogen at a pressure of 66 pounds per square inch gauge for a period of 10 days at a temperature of 50° C. The exposure to the nitrogen atmosphere increased the weight of the foamed particles from 10 grams to 10.26 grams. A sample of the primary foamed particle was exposed for 5 minutes in an atmosphere pressure in an air oven at 120° C. and subsequently cooled to about 25° C. The foam increased 42.8 times the unexpanded volume.

A mold of similar construction to that employed in Example I was used. However, the mold had a cavity of generally cubicle configuration measuring 5 inches on each edge. In the top surface of the mold was provided a stepped land approximately 3 inches in width and 2 inches in height having a step on one side thereof of 1 inch. The mold volume was 106.25 cubic inches. 48.2 grams of the nitrogen pressurized foam was added to the cavity and filled the cavity to a depth of 2.3 inches. The apparent bulk density of the loose particle mass was 0.051 grams per cubic centimeter and the mass was calculated to occupy 54 percent of the mold volume. The copper shot was maintained without air flow at 142° C. and air pressure of 140 pounds per square inch.

The hot air probe was inserted 1 inch into the mold cavity and the foam particles in the cavity were fluidized. When the cavity temperature reached 110° C. after a period of about 20 seconds, the probe was fully inserted to the top of the cavity and subsequently retracted after 70 seconds. The mold walls were heated 20 seconds after probe insertion and after 80 seconds the mold walls reached a temperature of 130° C. and power was removed from the heaters. The mold was cooled with ambient air flowing through cooling channels in the honeycomb material. The molding was removed when the mold walls reached a temperature of 70° C. The molding had a density of 1.73 pounds per cubic foot. Good duplication of the mold cavity was obtained. The molding was essentially free of interparticle and surface voids. It was rough, resilient and of good quality, suitable for cushion packaging.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for the molding of expanded synthetic resinous thermoplastic articles from a plurality of synthetic resinous particles, the steps of the method comprising providing a plurality of foamed synthetic resinous particles, introducing into the said foamed particles an expanding agent in a quantity sufficient that on heating said particles to a foaming temperature their volume will increase by a factor of at least 1.7;

disposing said particles within a mold having an inner molding surface;

introducing a heated gas substantially devoid of steam, which is a nonsolvent for the particles at at least one location generally remote from the inner surface of the mold, the heated gas being at a temperature sufficient to cause the particles to expand and adhere to one another, permitting said heated gas to escape from the mold; heating at least a major portion of an internal surface of the mold to a temperature to cause expandable particles adjacent thereto to expand and thereby provide a unitary synthetic resinous foam article.

2. The method of claim 1 including the step of introducing the expanding agent into the foamed particles by maintaining the particles under superatmospheric pressure.

3. The method of claim 2 wherein the expanding agent is air.

4. The method of claim 1 wherein the heated gas is introduced at a plurality of locations within the mold.

5. The method of claim 1 wherein all of the internal surface of the mold is heated.

6. The process of claim 1 wherein the foamed synthetic resinous particles are lightly crosslinked resinuous materials.

7. The process of claim 6 wherein the resinous material is a sytrene polymer.

8. A foam molding apparatus, the foam molding apparatus comprising in cooperative combination a metal mold having defined therein a molding cavity and means to introduce foamed particulate material into the cavity; the mold having an inner surface and an outer surface, the mold defining gas escape means extending between the inner surface and the outer surface of the mold;

means to heat the mold disposed on at least a major portion of the outer surface thereof;

means to cool the mold disposed on at least the major portion of the outer surface thereof;

means to introduce a heated gas substantially devoid of steam, within the mold at a location remote from the inner surface, said means introducing the gas at a location generally remote from the inner surface of the mold;

means to withdraw the means to introduce gas from the cavity of the mold.

9. The molding apparatus of claim 8 wherein the mold is a metal.

10. The molding apparatus of claim 8 including a plurality of means to introduce a heated gas at a location remote from the inner surface of the mold.

11. The apparatus of claim 8 wherein the means to heat the mold is an electrical resistance heater disposed on an external surface of the mold.

12. The apparatus of claim 8 wherein the means to cool the mold comprises a conduit adapted to communicate with a cooling fluid source.

13. The apparatus of claim 8 wherein the means to heat the mold is an electrical resistance heater and the means to cool the mold comprises a conduit adapted to receive a cooling fluid.

14. The apparatus of claim 8 wherein the means to introduce a heated gas within the mold comprises a tubular member having a mold entering end and a positioning end, the mold entering end being perforate and providing communication between the space within the tubular member and space external to the tubular member in combination with means to selectively position the tubular member within the mold or external to the mold.

15. The apparatus of claim 8 in operative combination with means defining a chamber having a first or entrance end and a second or exit end, the chamber having disposed therein a body of particulate metal; means to heat the particulate metal and means to supply heating fluid to the inlet end of the chamber.

* * * * *